United States Patent
Danilov et al.

(10) Patent No.: US 10,521,119 B1
(45) Date of Patent: Dec. 31, 2019

(54) HYBRID COPYING GARBAGE COLLECTOR

(71) Applicant: EMC IP Holding Company LLC, Hopkinton, MA (US)

(72) Inventors: Mikhail Danilov, Saint Petersburg (RU); Mark A. O'Connell, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 118 days.

(21) Appl. No.: 15/712,340

(22) Filed: Sep. 22, 2017

(51) Int. Cl.
*G06F 3/06* (2006.01)

(52) U.S. Cl.
CPC ............ *G06F 3/0608* (2013.01); *G06F 3/067* (2013.01); *G06F 3/0644* (2013.01); *G06F 3/0647* (2013.01); *G06F 3/0652* (2013.01)

(58) Field of Classification Search
CPC ...... G06F 3/0608; G06F 3/067; G06F 3/0644; G06F 3/0652; G06F 3/0647
See application file for complete search history.

(56) References Cited

U.S. PATENT DOCUMENTS

| | | | |
|---|---|---|---|
| 2010/0057976 A1* | 3/2010 | Lasser | G06F 13/385 711/103 |
| 2013/0117501 A1* | 5/2013 | Yun | G06F 12/0246 711/103 |
| 2014/0351628 A1* | 11/2014 | Higeta | G06F 11/2053 714/6.11 |
| 2015/0026390 A1* | 1/2015 | Li | G06F 12/0246 711/103 |

* cited by examiner

*Primary Examiner* — Hiep T Nguyen
(74) *Attorney, Agent, or Firm* — Amin, Turocy & Watson, LLP (57) ABSTRACT

The described technology is generally directed towards a hybrid copying garbage collector in a data storage system that processes low capacity real chunks and virtual chunks (which reference data on other storage systems) into real chunks with a relatively high data capacity utilization. Real and virtual chunks with low capacity utilization are detected and copied into a higher capacity utilization real chunk, after which the low capacity chunks are deleted and their space reclaimed. As a result, much of the virtual chunk data that is to be migrated into a real chunk in the data storage system is migrated during garbage collection instead of as a separate migration process. Only the virtual chunk data that is relatively high capacity needs to be processed into real chunks by a separate migration process.

20 Claims, 11 Drawing Sheets

HYBRID COPYING GARBAGE COLLECTOR

TECHNICAL FIELD

The subject application relates to data storage, e.g., to a hybrid copying garbage collector, and related embodiments.

BACKGROUND

Contemporary cloud-based storage systems such as Dell EMC® Elastic Cloud Storage (ECS™) service stored data in numerous ways for data protection and efficiency. One commonly practiced maintenance service performs garbage collection to reclaim storage space that was formerly used for storing user data, but is no longer in use.

In ECS™, user data are stored in chunks. There are real chunks comprising actual data stored in the ECS™ storage, and "virtual" chunks comprising user data referenced in the ECS™ storage that actually resides in one or more other storage systems. Over time, these virtual chunks are migrated into real chunks in the ECS™ storage system via a technique known as pull migration.

Pull migration runs in parallel with normal data traffic handling, whereby the migration service needs to be throttled down. As a result, the migration process normally takes many months; for large clusters the migration process may take over a year or even multiple years to complete. Until migrated, the data referenced by the virtual chunks does not have the ECS™ storage protection schemes, e.g., including replication and erasure coding that protect user data at the chunk level.

SUMMARY

Briefly, one or more aspects of the technology described herein are directed towards a hybrid garbage collector configured to process lower capacity real chunks of a data storage system and lower capacity virtual chunks of the data storage system, which have been identified according to a specified criterion, into higher capacity utilization real chunks of the data storage system, wherein the higher capacity utilization real chunks have a higher capacity utilization than the lower capacity real chunks and the lower capacity virtual chunks. In one or more aspects, the hybrid garbage collector is configured to detect a lower capacity real chunk of the lower capacity real chunks and a lower capacity virtual chunk of the lower capacity virtual chunks according to the specified criterion, wherein data of the lower capacity virtual chunk is from another data storage system and copy data from the lower capacity real chunk into a higher capacity utilization real chunk of the higher capacity utilization real chunks. The hybrid garbage collector migrates data referenced by the lower capacity virtual chunk into the higher capacity utilization real chunk, and deletes the lower capacity real chunk and the lower capacity virtual chunk.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards garbage collection in data storage, such as in Dell EMC® Elastic Cloud Storage™ (ECS™) that stores data in chunks. As will be understood, while copying user data from chunks for purposes of garbage collection, (e.g., to keep only the portions of the chunks in use), the hybrid copying garbage detector also performs data migration for portions of virtual chunks.

In general, chunks with low capacity utilization (relative to a criterion, such as a threshold utilization ratio) are detected. For such low capacity utilization chunks, data is copied into new chunks. Once their data is copied, the low capacity utilization chunks are deleted and their capacity is reclaimed. As will be understood, this works for real chunks with user data in the storage system and virtual chunks created to facilitate data migration from other storage systems.

In general and one or more implementations, e.g., ECS™, disk space is partitioned into a set of large blocks of fixed size called chunks; user data is stored in chunks. Chunks are shared, that is, one chunk may contain segments of multiple user objects, e.g., one chunk may contain mixed segments of some number of (e.g., three) user objects. This approach assures high write performance and capacity efficiency when storage clients write data only. However, when storage clients delete data, the deletions cause sections of dead capacity within chunks. As a result, capacity efficiency becomes an issue.

The concept of "virtual" chunks bypasses the relatively heavyweight handling of newly data that result from preliminary data protection schemes. In general, the new data remain in a in migration destination storage and are referenced by virtual chunks in the ECS™ system until a "pull migration" process (driven by a migration service) migrates data from the other (legacy) storage system or systems into the ECS™ system as real chunks. More particularly, the migration service uses a list of objects to be migrated to create their future layout in chunks. The migration service creates new chunks in accordance with the layout created. Note that no significant physical capacity is allocated for these "virtual" chunks. The migration service iterates over the list of virtual chunks and requests encoding for each of them.

Encoding of each chunk works as the storage service responsible for erasure coding (referred to as a chunk manager) reads the chunk into a volatile memory. Because the new chunk is virtual, the read requests are redirected to the source storage, that is, the destination storage pulls data from the source storage. The chunk manager performs encoding of the chunk in a volatile memory and stores data and coding fragments to cluster nodes/disks. In this way, pull migration helps to avoid the use of preliminary protection schemes, which dramatically increases the efficiency of the migration process. However, as set forth above, the migration process normally takes many months, and may take up to even years.

During such a prolonged period of time, a user may delete significant parts of the data objects from the initial migration scope. As a result, real chunks created by the migration service often have low capacity utilization. Many of them become candidates for copying garbage collection at the moment they are created. Meanwhile, the conventional copying garbage collector in ECS™ is very resource-intensive.

Described herein is a hybrid technology for copying garbage collection. The technology supports both real chunks and virtual chunks. The technology garbage collects from both real chunks and virtual chunks, performing a migration of the data of the virtual chunks and while performing the copying operations used by garbage collection.

It should be understood that any of the examples herein are non-limiting. For instance, some of the examples are based on ECS™ cloud storage technology; however virtually any storage system may benefit from the technology described herein. Thus, any of the embodiments, aspects, concepts, structures, functionalities or examples described herein are non-limiting, and the technology may be used in various ways that provide benefits and advantages in computing and data storage in general.

Figure 1:
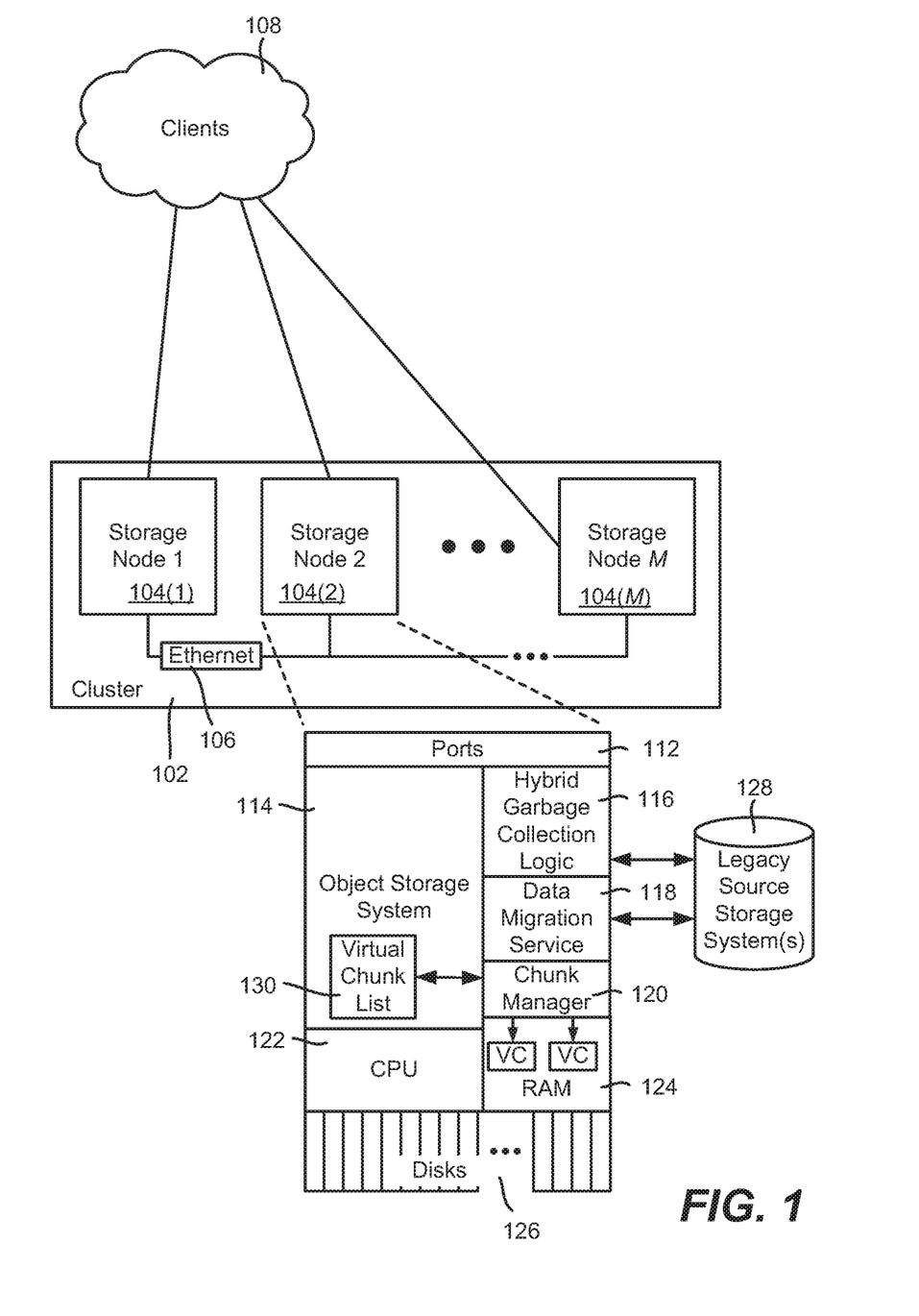
FIG. 1 is an example block diagram representation of part of a cloud data storage system including nodes, in which hybrid copying garbage collection logic processes real chunks and virtual chunks, according to one or more example implementations.

FIG. 1 shows part of a cloud data storage system such as ECS™ comprising a zone (e.g., cluster) 102 of storage nodes 104(1)-104(M), in which each node is typically a server configured primarily to serve objects in response to client requests. The nodes 104(1)-104(M) are coupled to each other via a suitable data communications link comprising interfaces and protocols such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of an object storage system 114 and data services, including hybrid copying garbage collection logic 116, a data migration service logic 118, and a chunk manager 120. A CPU 122 and RAM 124 are shown for completeness; note that the RAM 120 may comprise at least some non-volatile RAM. The node includes storage devices such as disks 126, comprising hard disk drives and/or solid-state drives.

In general, the data migration service 118 migrates data from one or more legacy source storage systems 128 into real chunks in the cluster 102. A chunk manager 120 creates virtual chunks (VCs) 124 for this purpose, e.g., the chunk manager creates a record for each virtual chunk and puts the record into the chunk table (persisted to a non-volatile memory).

As will be understood, the hybrid copying garbage collection logic 116 also accesses data in the legacy storage system(s) 128 via the virtual chunks (VCs), and may work with the chunk manager 120 and a virtual chunk list 130 to migrate data from the legacy storage system(s) 128 storing the copying garbage collection operations.

Figure 2:
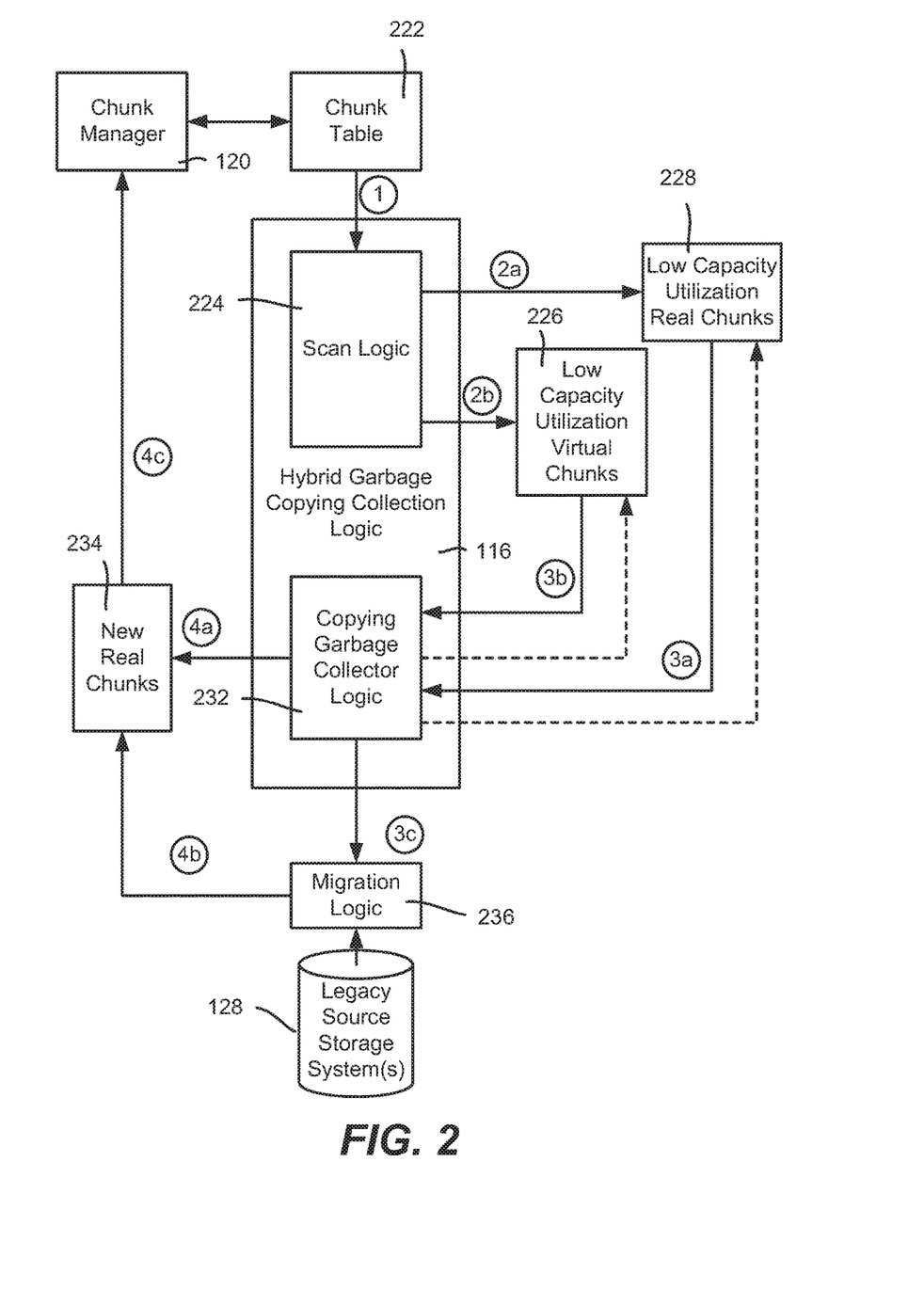
FIG. 2 is an example block/data operation diagram representation of hybrid garbage collection, according to one or more example implementations.

As represented in FIG. 2, the hybrid copying garbage collection logic 116 detects chunks with low capacity utilization. In one or more implementations, this may be done via periodic scanning of a chunk data structure (e.g., a chunk table 222) managed by the chunk manager 120, as represented in FIG. 2 via the scan logic 224 and the arrow labeled (1). Scanning finds both low capacity utilization real chunks 226 (arrow (2a)) and a low capacity utilization virtual chunks 228 (arrow (2b)).

Capacity utilization may be calculated as the ratio of used chunk capacity/total chunk capacity. A chunk is considered to have low (lower) capacity utilization when the chunk has capacity utilization below some predefined threshold. This threshold is selectable based on a tradeoff between capacity use efficiency and additional workload produced by the hybrid copying garbage collector. In ECS™, the threshold for below chunks may be set at a value 0.8. Therefore, up to twenty percent of storage capacity can remain "dead" because it is deemed too expensive to move user data around.

Note that the above threshold is set for real chunks. A tradeoff for virtual chunks is likely to be different because, as will be understood, copying data from a virtual chunk produce no significant additional workload. Therefore, the threshold for virtual chunks is typically set at a higher level, e.g., a utilization capacity ratio of 0.95 may be used in one or more implementations as the threshold for virtual chunks.

As represented in FIG. 2, copying garbage collector logic 232 of the hybrid copying garbage collector 116 offloads chunks (arrows (3a) and (3b)) with low capacity utilization previously detected during scanning. Note that the offloading operation works conventionally for real chunks, that is, the garbage collector logic 232 physically reads live data from old chunks and writes that data to new chunk(s) 234 (arrow (4a)) for use in the data storage system; the chunk manager 120 is part of this process (arrow (4b)). Note that new chunks to accommodate data from old chunks with low capacity utilization may be shared with new user data written to the system. With an alternative solution, the garbage collector may create dedicated chunks for its needs, (e.g., the hybrid copying garbage collector may have some features of a generational garbage collector).

To offload virtual chunks, the hybrid copying garbage collector makes read requests (e.g., to migration logic 236) for live object segments "stored" in virtual chunks that are redirected to a migration source storage 128 (arrow (3*c*)), to migrate data migrates the data (arrow (4*b*)) into new real chunks 234, again with the chunk manager 120 participating in the process. Note that data copying from virtual chunks thus produces no significant additional workload, as objects from a source storage need to be copied to a destination storage in any event in order to perform migration. Thus, the hybrid copying garbage collection logic 116 performs part of work of the migration service.

Once each of the portions (e.g., segments) from a lower capacity chunk have been written to a real chunk, the hybrid copying garbage collection logic deletes the old chunks, and thereby reclaims their capacity. Capacity is reclaimed for real chunks only, as virtual chunks occupy virtually no real capacity (although of course the virtual chunk references may be cleaned up from memory, tables, etc.).

Figure 3:
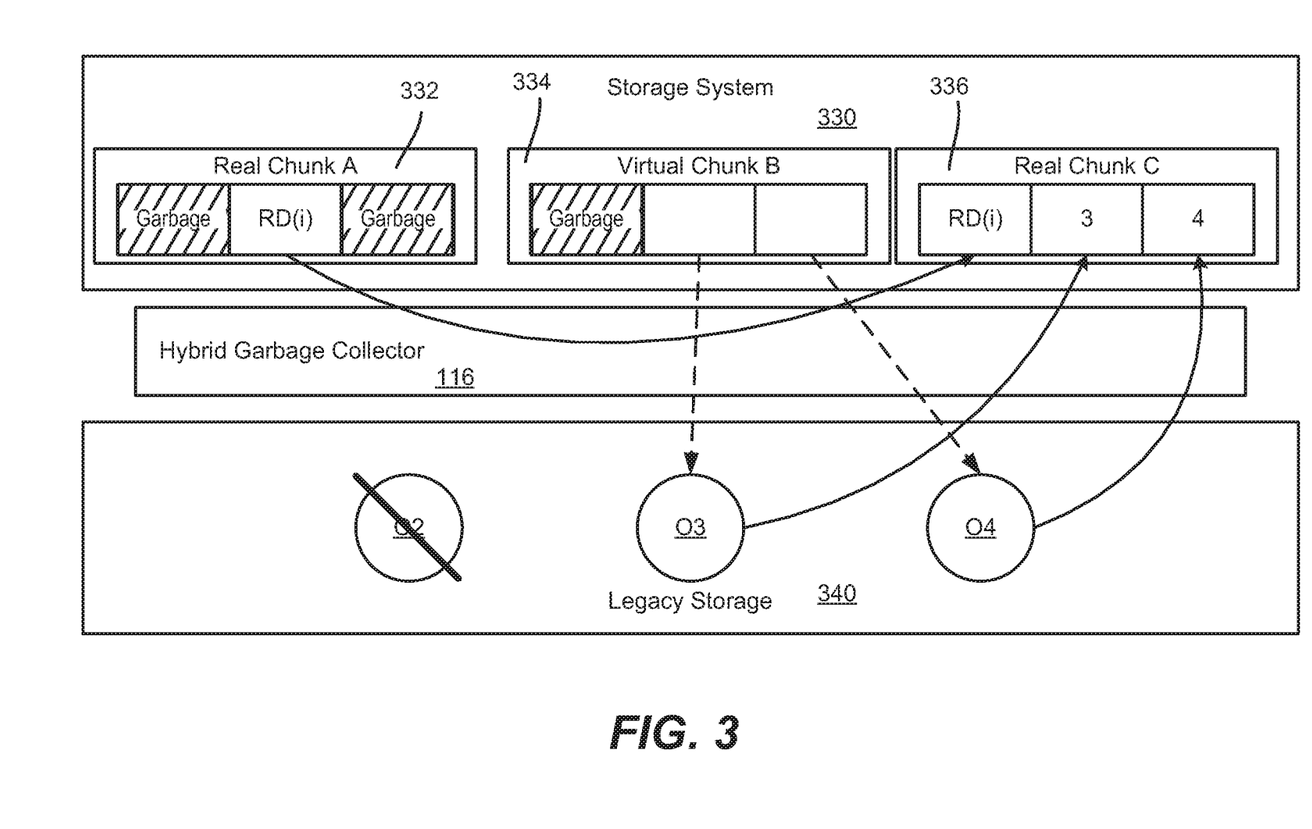
FIG. 3 is an example representation of how real chunk data and virtual chunk data is copied into a real chunk during hybrid card which collection, according to one or more example implementations.

Turning to the example of FIG. 3, consider that a storage system 330 contains real chunk A 332 and virtual chunk B 334. Real chunk A 332 contains only the i-th segment (real data, or RD(i)) of an object. In this example, this segment RD(i) occupies only ⅓ of the real chunk A 332, with the remaining ⅔ of the chunk content being garbage. Therefore, the real chunk has low capacity utilization (⅓<0.8).

There is also pull migration ongoing. The migration service of the ECS (the destination storage) has created virtual chunk B 334. This virtual chunk B 334 references three objects O2, O3, and O4 in a legacy storage (the source storage) 340. By the moment the migration service of ECS comes to virtual chunk B to make it a real object, object O2 has been deleted, changing if the migration scope. Thus the capacity utilization of virtual chunk B is also rather low (⅔). One or more current implementations of the migration service processes the chunk into a real chunk; conventional garbage collection will eventually copy this real chunk into a higher utilization real chunk.

More particularly, in the conventional system two real chunks will exist having low capacity of ⅓ and ⅔, respectively, which at some point will be solved by a conventional copying garbage collector, e.g., copying the lower capacity chunks into a single real chunk with one-hundred percent capacity and deleting the lower capacity chunks.

In contrast, with the technology described herein, the hybrid copying garbage collector 116 achieves the same result in a more efficient manner. For example, as described below if, the migration service may be configured to skip over low capacity utilization chunks, including virtual chunk B (⅔ utilization capacity). The hybrid copying garbage collector does not distinguish between real chunks and virtual chunks, but rather detects chunks with low capacity utilization (including real chunk A 332 and virtual chunk B 334) and merges them into a new real chunk C 334 in this example. When the garbage collector reads data from virtual chunk B, the collector basically reads data from the legacy storage.

In the example of FIG. 3, there are still two types of data traffic, but with different numbers relative to conventional operations of separate migration and separate garbage collection, namely data migration (⅔ of chunk size) and data copying (⅓ of chunk size vs. one chunk size in conventional operations).

Although the example of the copying garbage collector in FIG. 3 is relatively simplified, the example still demonstrates a considerable reduction of data traffic. Reduction of data traffic is dramatic when an operating instance of the hybrid copying garbage collector handles virtual chunks only. In such an event, the operations eliminate data copying between real chunks.

As mentioned above and as represented in FIG. 4, the migration service 118 may be aware of the fact that it has a helper (the hybrid copying data collection logic 116) and consequently ignore virtual chunks with low capacity utilization (e.g., less than or equal to 0.95). If so, the migration service does not produce real chunks with low capacity utilization, but rather leaves such virtual chunks for the hybrid copying data collection logic 116, and instead only handles virtual chunks with normal/high capacity utilization in the conventional way.

Figure 4:
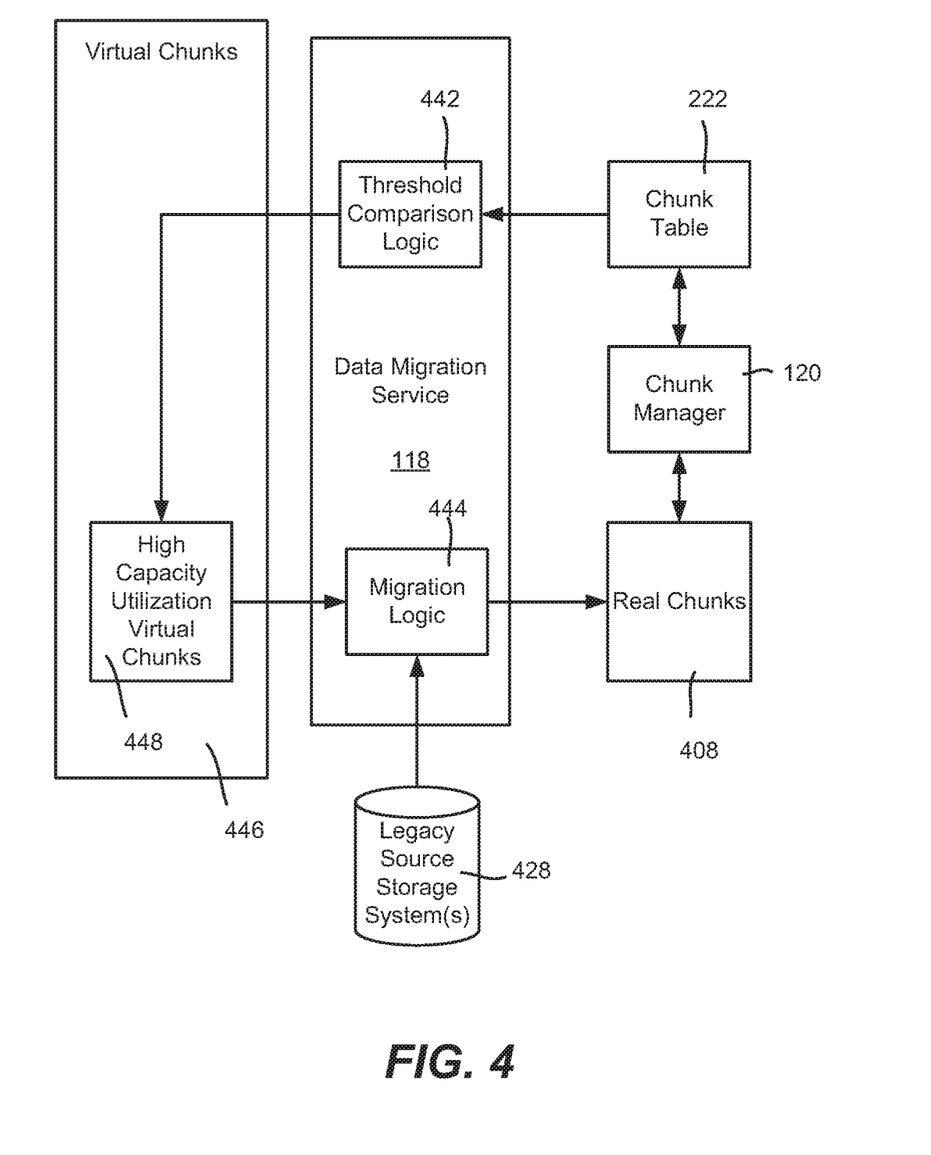
FIG. 4 is an example representation of how a data migration service can leverage hybrid copying garbage collection has a helper, according to one or more example implementations.

To this end, the data migration service 118 may be configured with threshold comparison logic 442 and migration logic 444. In this way, the data migration service 118 filters out low capacity utilization virtual chunks from the full set of virtual chunks 446 and processes only the remaining high capacity utilization virtual chunks 448. For example, the threshold comparison logic 442 may scan the chunk table to compute which virtual chunks are low capacity and which are high capacity (e.g., above 0.95) chunks that need to be migrated into real chunks 450.

Figure 5:
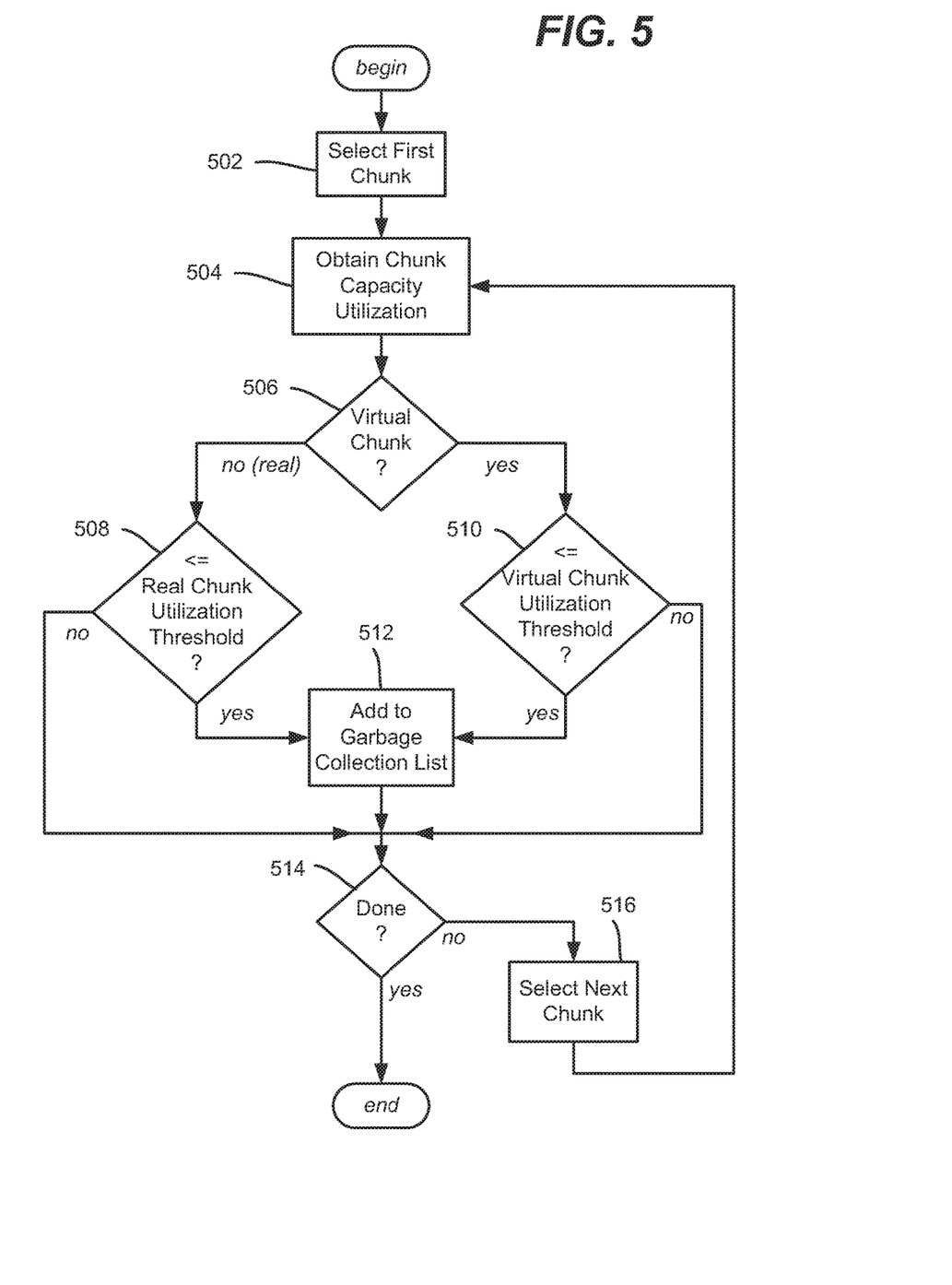
FIG. 5 is a flow diagram representing example operations exemplified as steps for locating real and/or virtual chunks for garbage collection, according to one or more example implementations.

FIG. 5 is a flow diagram representing example logic/operations exemplified as steps for operations of the scanning portion of the hybrid copying garbage collector beginning at step 502 which represents selecting a first chunk, e.g. from the chunk table. Note that some of the steps may be ordered differently, and or performed in parallel or substantially in parallel.

Step 504 represents obtaining (e.g., computing) the chunk capacity utilization for the selected chunk. Step 506 represents evaluating whether the selected chunk is a virtual chunk or a real chunk; note that this may not be needed in an implementation in which a chunk table distinguishes between real chunks and virtual chunks in advance. In any event, real chunks are evaluated relative to the real chunk utilization threshold as represented via step 508, while virtual chunks are evaluated relative to the virtual chunk utilization threshold has represented via step 510. Chunks are considered having low/lower capacity utilization are to be garbage collected, e.g. added to a garbage collection list at step 512.

Steps 514 and 516 repeat the process for the next shot and so on until some stopping criteria is reached. This may be time based, e.g., garbage collect for some amount of time, based on a number of chunks, based on some percentage of the node size or some other stopping criteria is as appropriate for a given data storage system.

Figure 6:
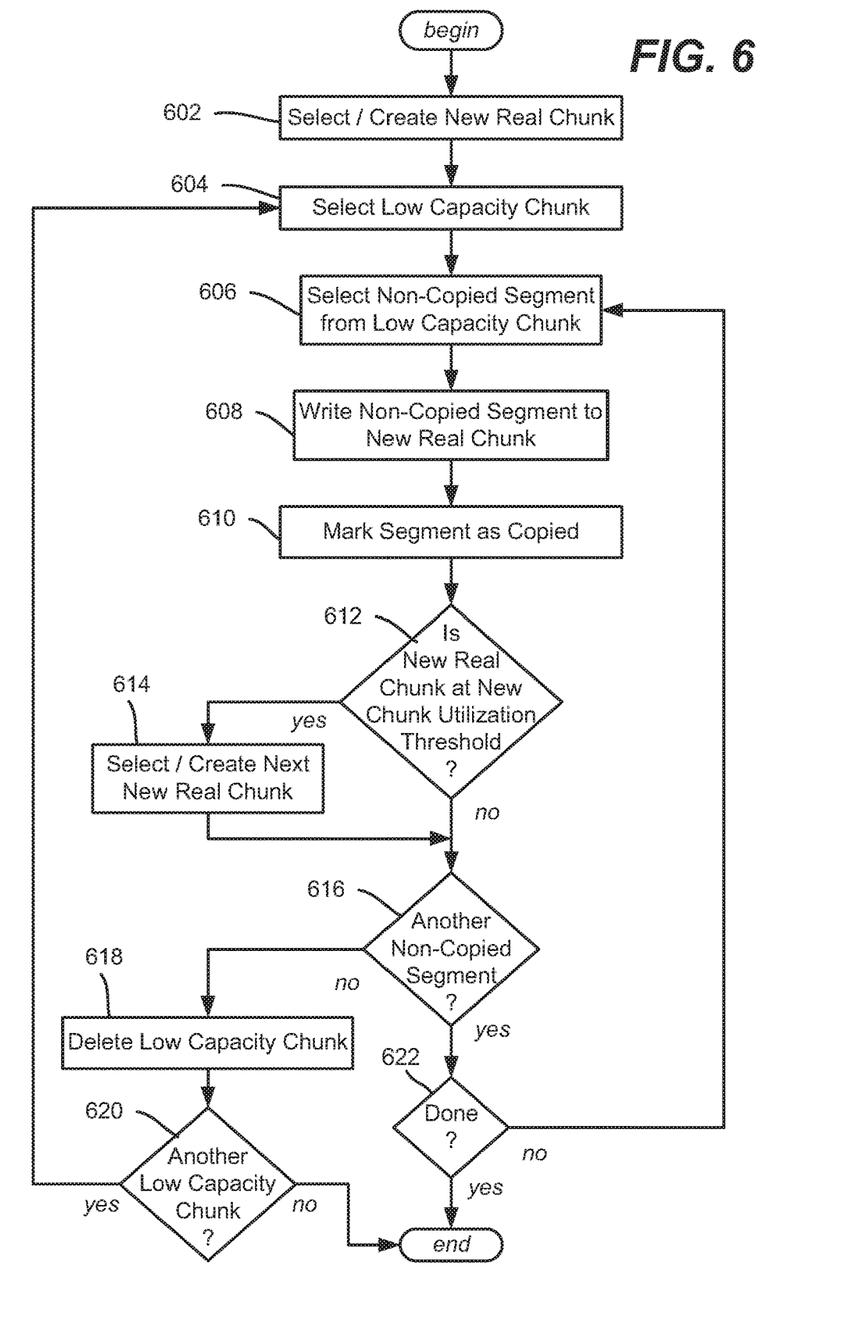
FIG. 6 is a flow diagram representing example operations exemplified as steps for performing hybrid copying garbage collection, according to one or more example implementations.

When at least part of the chunk data storage (e.g., chunk table) has been scanned and at least one chunk has been found to be considered lower capacity, hybrid copying garbage collection may begin as generally represented in the operations exemplified as steps in FIG. 6. Copying garbage collection may be performed in many ways, and the operations in FIG. 6 are only examples of some of logic that may be performed.

Step 602 selects/creates (or causes to be created) a new real chunk as needed. Note for example a new real chunk may not be needed if previous garbage collection operations halted with space remaining in the new real chunk.

Step 604 selects a low capacity chunk, e.g. from the list scanned in FIG. 5. Step 606 selects a non-copied segment from that low capacity chunk, and step 608 writes the non-copied segment to the new real chunk. Step 610 marks that segment as having been copied.

Step 612 represents evaluating whether the new real chunk is "full" enough to start a new chunk, e.g., exceeds a high percentage capacity utilization. If so, step 614 selects or creates a new real chunk. Note that many alternatives may be performed around this time, and may for example be dependent upon the size of the segments being written. For example, if segments can be relatively large, before writing to a real chunk, an evaluation may be made as to whether the real chunk has enough room to handle the write operation; if not, a newer new real chunk may be started at that time, with the older real chunk remaining available for handling a smaller write operation. If segments are relatively small, the operations of FIG. 6 can be used with a relatively high new chunk utilization threshold at step 612.

As exemplified in FIG. 6, step 616 evaluates whether another non-copied segment remains in the selected low capacity chunk. If not, step 618 deletes the low capacity chunk, although this may not actually delete the chunk at this time but rather market for deletion for a later, more efficient multiple-chunk deletion/space reclamation operation. Step 620 repeats the process for the next low capacity chunk until none remain.

It is also possible for copying garbage collection to end as a result of another stopping criterion, e.g. time, number of chunks handled, number of segments handled and so forth. Step 622 represents stopping copying garbage collection until a next card which collection iteration.

Figure 7:
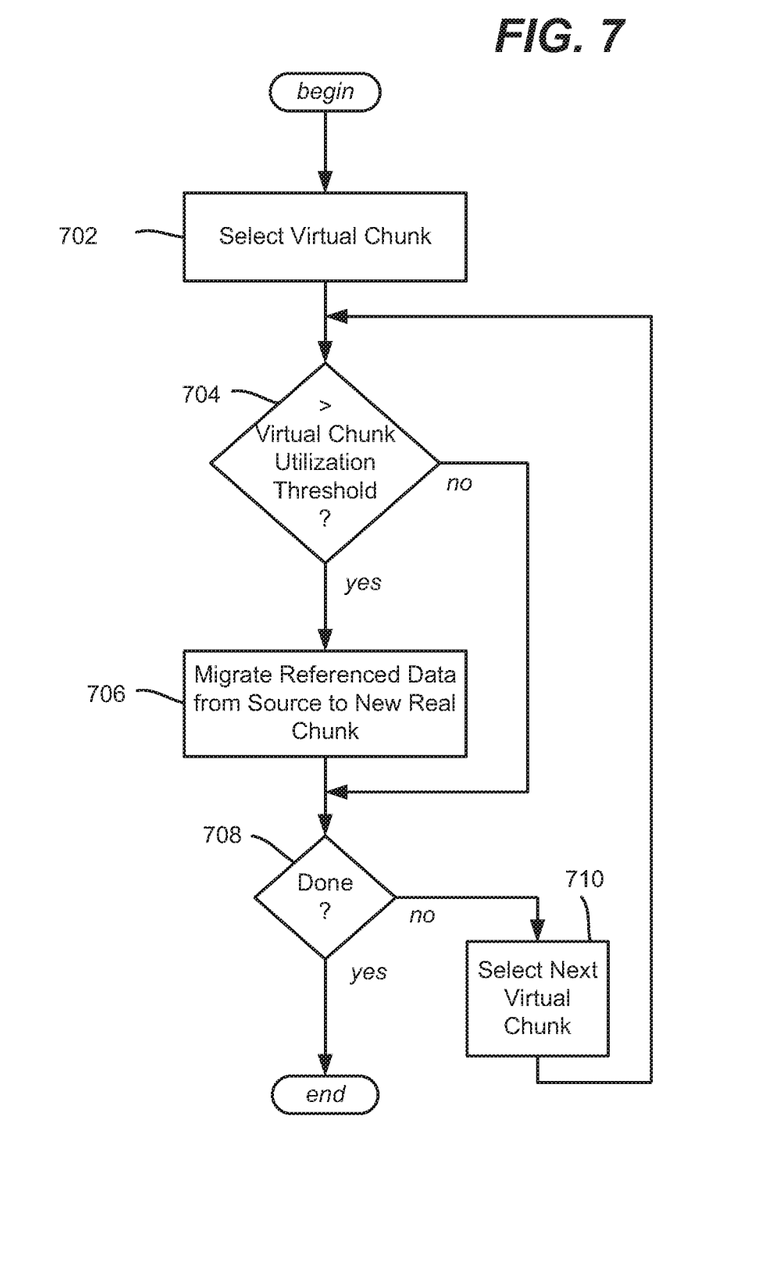
FIG. 7 is an example flow diagram showing example operations exemplified as steps related to the selected migration of only higher capacity utilization virtual chunks, according to one or more example implementations.

Turning to example operations (exemplified as steps) of a data migration service that has been configured to ignore low capacity utilization chunks, step 702 of FIG. 7 represents selecting a virtual chunk for possible data migration. Step 704 compares the selected virtual chunk against a virtual chunk utilization threshold, e.g. greater than 0.95.

If greater than the threshold, step 706 migrates the reference data from the source to a new real chunk, e.g., in the conventional matter. Otherwise step 704 bypasses the migration operation for this chunk.

Step 708 evaluates the migration against a stopping criterion (e.g., time, number of chunks, etc.) and along with step 710, repeat the migration process until this iteration of the migration process is halted.

As can be seen, described herein is an efficient technology for copying garbage collection that handles some of the tasks of data migration, reducing overall operations and data traffic. In existing ECS™ technologies, the hybrid copying garbage collection technology is practical and straightforward to implement, as existing mechanisms such as the garbage collector need only be modified to handle virtual chunks and threshold values and the like; (the data migration service only needs to handle a migration threshold value), to make automatic storage capacity management more efficient.

Figure 8:
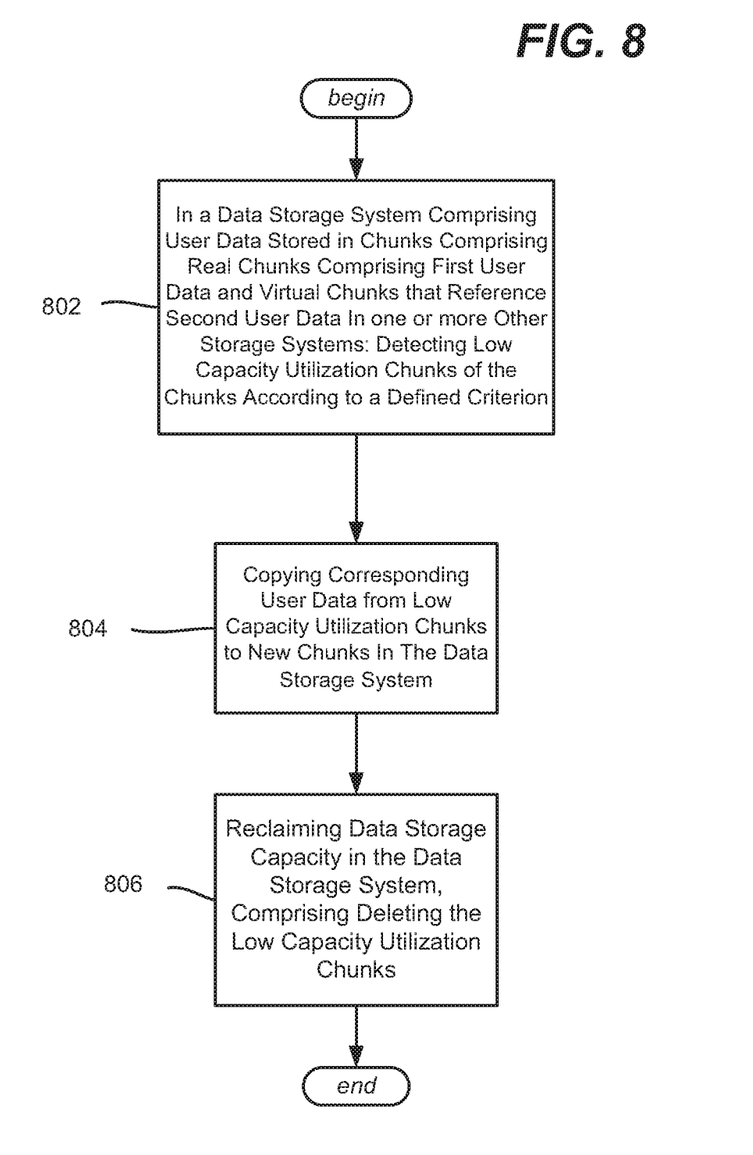
FIG. 8 is an example flow diagram showing example operations related to hybrid garbage copying collection, according to one or more example implementations.

One or more aspects are represented as example operations in FIG. 8, and operate in a data storage system comprising user data stored in chunks comprising real chunks comprising first user data and virtual chunks that reference second user data in one or more other storage systems. One depicted operation comprises detecting low capacity utilization chunks of the chunks according to a defined criterion (operation 802). Operation 804 represents copying corresponding user data from the low capacity utilization chunks to new chunks in the data storage system. Operation 806 represents reclaiming data storage capacity in the data storage system, comprising deleting the low capacity utilization chunks.

Detecting the low capacity utilization chunks may comprise scanning a chunk management data structure. Detecting the low capacity utilization chunks may comprise evaluating the real chunks relative to a real chunk capacity utilization threshold value. Evaluating the real chunks relative to the real chunk capacity utilization threshold value may comprise determining, for each real chunk of the real chunks evaluated, a ratio of used real chunk capacity to total real chunk capacity.

Detecting the low capacity utilization chunks may comprise evaluating ones of the virtual chunks of the data storage system, which reference data in the one or more other data storage systems, relative to a virtual chunk capacity utilization threshold value. Evaluating the virtual chunks relative to the virtual chunk capacity utilization threshold value may comprise determining, for each virtual chunk of the virtual chunks evaluated, a ratio of used virtual chunk capacity to total virtual chunk capacity.

Detecting the low capacity utilization chunks may comprise evaluating the real chunks comprising the first user data in the data storage system relative to a real chunk capacity utilization threshold value, and evaluating ones of the virtual chunks of the data storage system, which reference data in the one or more other data storage systems, relative to a virtual chunk capacity utilization threshold value. Evaluating the real chunks relative to the real chunk capacity utilization threshold value may comprise determining, for each real chunk of the real chunks evaluated, a first ratio of used real chunk capacity to total real chunk capacity, wherein the evaluating the virtual chunks relative to the virtual chunk capacity utilization threshold value may comprise determining, for each virtual chunk of the virtual chunks evaluated, a second ratio of used virtual chunk capacity to total virtual chunk capacity, and wherein the first ratio is equal to the second ratio. Evaluating the real chunks relative to the real chunk capacity utilization threshold value may comprise determining, for each real chunk of the real chunks evaluated, a first ratio of used real chunk capacity to total real chunk capacity, wherein the evaluating the virtual chunks relative to the virtual chunk capacity utilization threshold value may comprise determining, for each virtual chunk of the virtual chunks evaluated, a second ratio of used virtual chunk capacity to total virtual chunk capacity, and wherein the first ratio is different from the second ratio. Evaluating the real chunks relative to the real chunk capacity utilization threshold value may comprise determining, for each real chunk of the real chunks evaluated, a first ratio of used real chunk capacity to total real chunk capacity, wherein the evaluating the virtual chunks relative to the virtual chunk capacity utilization threshold value may comprise determining, for each virtual chunk of the virtual chunks evaluated, a second ratio of used virtual chunk capacity to total virtual chunk capacity, and wherein the second ratio is larger than the first ratio.

Figure 9:
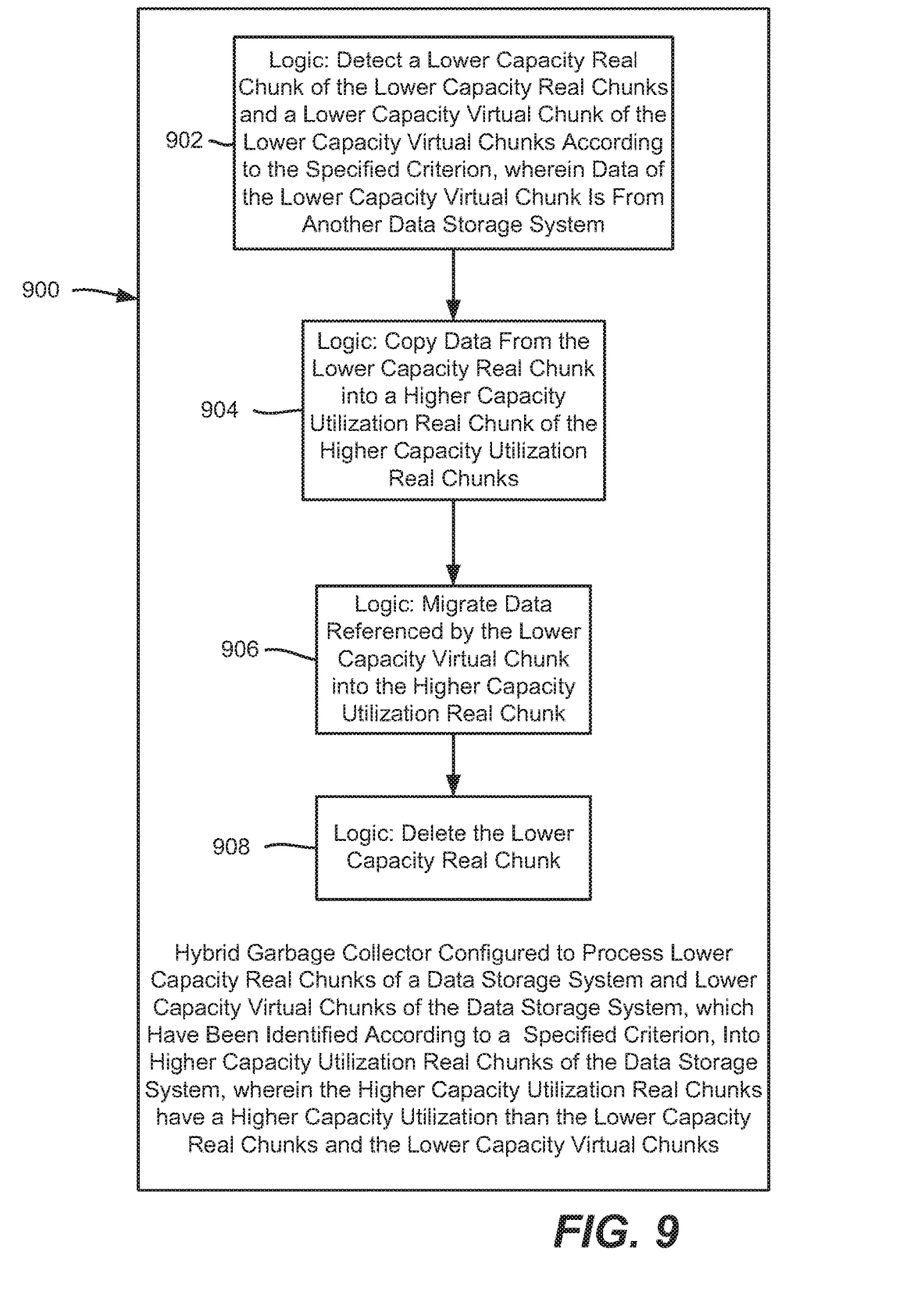
FIG. 9 is an example block diagram showing example logic components of a hybrid copying garbage collector, according to one or more example implementations.

One or more aspects, depicted as example blocks in FIG. 9, comprise a hybrid garbage collector (block 900) configured to process lower capacity real chunks of a data storage system and lower capacity virtual chunks of the data storage system, which have been identified according to a specified criterion, into higher capacity utilization real chunks of the data storage system, wherein the higher capacity utilization real chunks have a higher capacity utilization than the lower capacity real chunks and the lower capacity virtual chunks. The hybrid garbage collector, is configured (e.g., with logic) to (block 902) detect a lower capacity real chunk of the lower capacity real chunks and a lower capacity virtual chunk of the lower capacity virtual chunks according to the specified criterion, wherein data of the lower capacity virtual chunk is from another data storage system, copy data from the lower capacity real chunk into a higher capacity utilization real chunk of the higher capacity utilization real chunks (block 904), migrate data referenced by the lower capacity virtual chunk into the higher capacity utilization real chunk (block 906), and delete the lower capacity real chunk (block 908).

The hybrid garbage collector may be configured to scan a chunk table managed by a chunk manager to detect the lower capacity real chunk and the lower capacity virtual chunk. The hybrid garbage collector may be configured to detect the lower capacity real chunk based on a first data capacity utilization ratio and detect the lower capacity virtual chunk based on a second data capacity utilization ratio.

A data migration component may be configured to migrate data referenced by virtual chunks from one or more other data storage systems into the higher capacity utilization real chunks. The data migration component may be configured to ignore lower capacity utilization virtual chunks and migrate data referenced by the virtual chunks with higher data utilization capacity.

Figure 10:
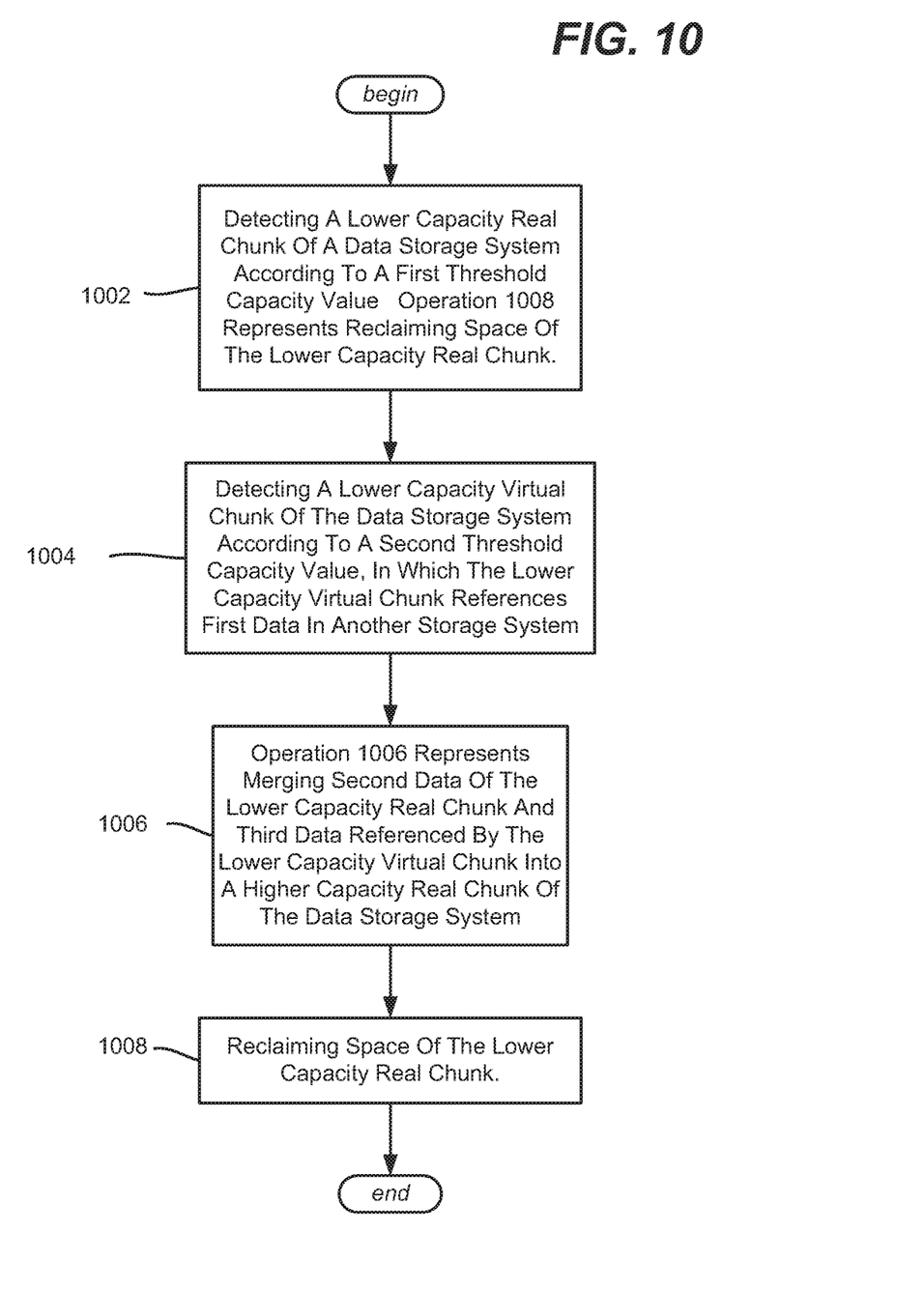
FIG. 10 is an example flow diagram showing example operations related to hybrid garbage copying collection, according to one or more example implementations.

One or more aspects, depicted as example operations in FIG. 10, comprise detecting a lower capacity real chunk of a data storage system according to a first threshold capacity value (operation 1002) and detecting a lower capacity virtual chunk of the data storage system according to a second threshold capacity value, in which the lower capacity virtual chunk references first data in another storage system (operation 1004). Operation 1006 represents merging second data of the lower capacity real chunk and third data referenced by the lower capacity virtual chunk into a higher capacity real chunk of the data storage system. Operation 1008 represents reclaiming space of the lower capacity real chunk.

Detecting the lower capacity real chunk of the data storage system according to the first threshold capacity value may comprise evaluating real chunks comprising user data in the data storage system against a real chunk capacity utilization threshold value. Detecting the lower capacity virtual chunk of the data storage system according to the second threshold capacity value may comprise evaluating virtual chunks against a virtual chunk capacity utilization threshold value.

Detecting the lower capacity real chunk of the data storage system according to the first threshold capacity value may comprise evaluating real chunks comprising user data in the data storage system against a real chunk capacity utilization threshold value, wherein detecting the lower capacity virtual chunk of the data storage system according to the second threshold capacity value may comprise evaluating virtual chunks against a virtual chunk capacity utilization threshold value, and wherein the real chunk capacity utilization threshold value is different from the virtual chunk capacity utilization threshold value. One or more other operations may comprise migrating data referenced by higher capacity virtual chunks of the data storage system into real chunks of the data storage system.

Example Computing Device

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
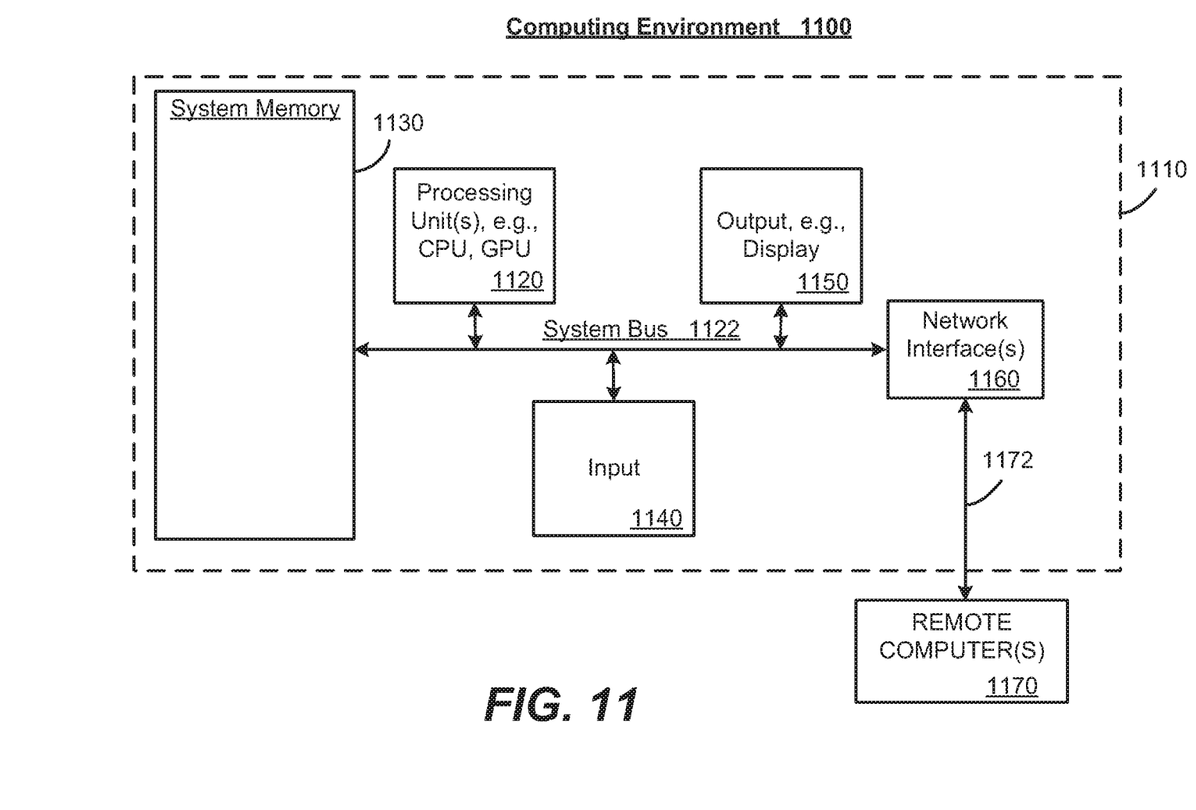
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
in a data storage system comprising user data stored in chunks, the chunks comprising real chunks and virtual chunks, the real chunks comprising first user data, and the virtual chunks referencing second user data in one or more other storage systems, detecting low capacity utilization chunks of the real chunks and the virtual chunks according to a defined criterion;
wherein the detecting the low capacity utilization chunks comprises:
evaluating the real chunks relative to a real chunk capacity utilization threshold value, at least in part by determining, for at least one real chunk of the real chunks, a first ratio of used real chunk capacity to total real chunk capacity; and
evaluating the virtual chunks relative to a virtual chunk capacity utilization threshold value, at least in part by determining, for at least one virtual chunk of the virtual chunks, a second ratio of used virtual chunk capacity to total virtual chunk capacity;

copying corresponding user data from the low capacity utilization chunks to new chunks in the data storage system; and reclaiming data storage capacity in the data storage system, comprising deleting the low capacity utilization chunks.

2. The method of claim 1, wherein the detecting the low capacity utilization chunks comprises scanning a chunk management data structure.

3. The method of claim 2, wherein the scanning the chunk management data structure is performed periodically.

4. The method of claim 1, wherein the new chunks in the data storage system comprise the corresponding user data from the low capacity utilization chunks along with new user data written to the data storage system.

5. The method of claim 1, further comprising migrating the user data stored in chunks from a legacy storage system to the data storage system.

6. The method of claim 5, further comprising offloading at least one virtual chunk by making at least one read request for live object segments in the at least one virtual chunk.

7. The method of claim 6, wherein the at least one read request is redirected to a migration source storage.

8. The method of claim 1, wherein the first ratio is equal to the second ratio.

9. The method of claim 1, wherein the first ratio is different from the second ratio.

10. The method of claim 1, wherein the second ratio is larger than the first ratio.

11. A system, comprising,
a hybrid garbage collector configured to process lower capacity real chunks of a data storage system and lower capacity virtual chunks of the data storage system, which have been identified according to a specified criterion, into higher capacity utilization real chunks of the data storage system, wherein the higher capacity utilization real chunks have a higher capacity utilization than the lower capacity real chunks and the lower capacity virtual chunks, the hybrid garbage collector being configured to:

detect a lower capacity real chunk of the lower capacity real chunks and a lower capacity virtual chunk of the lower capacity virtual chunks according to the specified criterion, wherein data of the lower capacity virtual chunk is from another data storage system;

copy data from the lower capacity real chunk into a higher capacity utilization real chunk of the higher capacity utilization real chunks;

migrate data referenced by the lower capacity virtual chunk into the higher capacity utilization real chunk; and delete the lower capacity real chunk.

12. The system of claim 11, wherein the hybrid garbage collector is configured to scan a chunk table managed by a chunk manager to detect the lower capacity real chunk and the lower capacity virtual chunk.

13. The system of claim 11, wherein the hybrid garbage collector is configured to detect the lower capacity real chunk based on a first data capacity utilization ratio and detect the lower capacity virtual chunk based on a second data capacity utilization ratio.

14. The system of claim 11, further comprising a data migration component configured to migrate data referenced by virtual chunks from one or more other data storage systems into the higher capacity utilization real chunks.

15. The system of claim 14, wherein the data migration component is configured to ignore lower capacity utilization virtual chunks and migrate data referenced by the virtual chunks with higher data utilization capacity.

16. A non-transitory machine-readable medium, comprising executable instructions that, when executed by a processor, facilitate performance of operations, the operations comprising:

detecting a lower capacity real chunk of a data storage system according to a first threshold capacity value;

detecting a lower capacity virtual chunk of the data storage system according to a second threshold capacity value, in which the lower capacity virtual chunk references first data in another storage system;

merging second data of the lower capacity real chunk and third data referenced by the lower capacity virtual chunk into a higher capacity real chunk of the data storage system; and reclaiming space of the lower capacity real chunk.

17. The non-transitory machine-readable medium of claim 16, wherein the detecting the lower capacity real chunk of the data storage system according to the first threshold capacity value comprises evaluating real chunks comprising user data in the data storage system against a real chunk capacity utilization threshold value.

18. The non-transitory machine-readable medium of claim 16, wherein the detecting the lower capacity virtual chunk of the data storage system according to the second threshold capacity value comprises evaluating virtual chunks against a virtual chunk capacity utilization threshold value.

19. The non-transitory machine-readable medium of claim 16, wherein the detecting the lower capacity real chunk of the data storage system according to the first threshold capacity value comprises evaluating real chunks comprising user data in the data storage system against a real chunk capacity utilization threshold value, wherein detecting the lower capacity virtual chunk of the data storage system according to the second threshold capacity value comprises evaluating virtual chunks against a virtual chunk capacity utilization threshold value, and wherein the real chunk capacity utilization threshold value is different from the virtual chunk capacity utilization threshold value.

20. The non-transitory machine-readable medium of claim 16, the operations further comprising, migrating data referenced by higher capacity virtual chunks of the data storage system into real chunks of the data storage system.

* * * * *